(12) United States Patent
Baumann et al.

(10) Patent No.: US 8,660,775 B2
(45) Date of Patent: Feb. 25, 2014

(54) METHOD AND DEVICE FOR OPERATING AN ENGINE START-STOP FUNCTION FOR THE DRIVING ENGINE OF A MOTOR VEHICLE

(75) Inventors: Guido Baumann, Stuttgart (DE); Eckhart Festerling, Jihlava (CZ); Pierre Mathis, Esslingen (DE); Enrique Naupari, Kernen I.R. (DE); Stefan Ostertag, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 908 days.

(21) Appl. No.: 12/592,671

(22) Filed: Nov. 30, 2009

(65) Prior Publication Data

US 2010/0152995 A1 Jun. 17, 2010

(30) Foreign Application Priority Data

Dec. 15, 2008 (DE) .................... 10 2008 054 655

(51) Int. Cl.
*F02N 11/08* (2006.01)
(52) U.S. Cl.
USPC ...... 701/112; 123/179.4; 123/481; 123/198 F

(58) Field of Classification Search
USPC ......... 123/179.4, 179.3, 481, 198 F; 701/112, 701/113
See application file for complete search history.

(56) References Cited

U.S. PATENT DOCUMENTS

| | | | |
|---|---|---|---|
| 7,481,194 B2* | 1/2009 | Celisse et al. | 123/179.4 |
| 7,657,366 B2* | 2/2010 | Guy et al. | 701/112 |
| 7,699,034 B2* | 4/2010 | Abendroth et al. | 123/179.4 |
| 2007/0233358 A1* | 10/2007 | Celisse et al. | 701/112 |
| 2007/0245997 A1* | 10/2007 | Levasseur et al. | 123/179.4 |
| 2007/0272187 A1* | 11/2007 | Celisse et al. | 123/179.4 |
| 2011/0066359 A1* | 3/2011 | Lin et al. | 701/112 |

* cited by examiner

*Primary Examiner* — Stephen K Cronin
*Assistant Examiner* — Raza Najmuddin
(74) *Attorney, Agent, or Firm* — Kenyon & Kenyon LLP

(57) ABSTRACT

In a method for operating an engine start-stop function for an engine of a motor vehicle, the engine start-stop function executes engine start-stop interventions in the form of an automatic shutting down and a subsequent automatic switching on of the engine, as a function of one or more vehicle states. An engine start-stop intervention determined by the engine start-stop function is selectively prevented as a function of a statement on the number of starting procedures of the engine carried out.

18 Claims, 4 Drawing Sheets

Fig. 3

Starts per route unit or time unit

| d_A_start | -7 | -6 | -5 | -4 | -3 | -2 | -1 | 0 |
|---|---|---|---|---|---|---|---|---|
| 0 | 0 | 0 | 0 | 0 | 0 | 0 | 0 | 1 |
| 1 | 0 | 0 | 0 | 0 | 1 | 1 | 1 | 1 |
| 2 | 0 | 0 | 1 | 1 | 0 | 0 | 0 | 1 |
| 3 | 0 | 1 | 0 | 0 | 1 | 1 | 1 | 1 |
| 4 | 0 | 0 | 0 | 0 | 0 | 0 | 0 | 1 |
| 5 | 0 | 0 | 1 | 1 | 1 | 1 | 1 | 1 |
| 6 | 0 | 0 | 0 | 0 | 0 | 0 | 0 | 1 |
| 7 | 0 | 1 | 0 | 0 | 1 | 1 | 1 | 1 |
| 8 | 0 | 0 | 1 | 1 | 0 | 0 | 0 | 1 |
| 9 | 0 | 0 | 0 | 0 | 0 | 0 | 0 | 1 |

METHOD AND DEVICE FOR OPERATING AN ENGINE START-STOP FUNCTION FOR THE DRIVING ENGINE OF A MOTOR VEHICLE

BACKGROUND OF THE INVENTION

1. Field of the Invention

The present invention relates to an engine system, especially for vehicles equipped with an engine start-stop automatic system.

2. Description of Related Art

Modern vehicles are equipped with engine systems that have an engine start-stop function. The engine start-stop function is used to shut down the engine, especially when an internal combustion engine is involved, if no torque is to be called for. This applies, above all, if it is to be expected that the torque will not be requested for a certain period of time. If the internal combustion engine according to this engine start-stop function has been shut down, in the case of requests for a drive torque, the internal combustion engine starts automatically, without the driver of the vehicle having to give a start instruction, such as by turning the ignition key, to start the internal combustion engine.

The engine start-stop function is used to save fuel, and therewith particularly to reduce the $CO_2$ emissions. However, shutting down the internal combustion engine and, above all, switching on the internal combustion engine leads to an increased stress on engine components subject to wear, such as the starter or components in the hydraulic system (fuel injection system) which, as a rule, are designed or constructed for a certain number of working cycles or activations.

Based on the engine start-stop function, under certain circumstances it is possible that a large number of start-stop processes of the internal combustion engine are executed over its lifetime. Because of this, individual components of the internal combustion engine may experience increased stress, and this may even lead to the maximum number of working cycles or activations, specified by the manufacturer, being exceeded. This leads to an increased risk of failure for the respective component and it is consequently able substantially to lower the service life of the internal combustion engine. Increasing the robustness of the respective components leads to greater cost, and is not cost-neutral.

BRIEF SUMMARY OF THE INVENTION

It is an object of the present invention to provide a method and a device for implementing an engine start-stop function for a driving engine, which take into account the susceptibility to wear and the service life of components of the internal combustion engine, and ensure that the engine start-stop function is assured over the entire specified service life of the driving engine of the vehicle, or for the specified total mileage of the vehicle that is operated by the driving engine.

According to one first aspect, a method is provided for operating an engine start-stop function for a driving engine of a motor vehicle, especially for an internal combustion engine. The engine start-stop function, in this context, executes engine start-stop interventions in the form of an automatic shutting down and a subsequent automatic switching on of the driving engine, as a function of one or more vehicle states. An engine start-stop intervention determined by the engine start-stop function is released as a function of a statement on the number of starting processes of the driving engine carried out.

One idea of the above method is to control the execution of an engine start-stop intervention by the engine start-stop function as a function of the number of starting processes carried out up to that point. This may enable the user, for instance, to have uniform utilization of the engine start-stop function over the entire service life of the driving engine, without having permanently to deactivate the engine start-stop function at a certain point in time before reaching the service life of the driving engine, to protect individual components of the driving engine. Instead, reaching the highest possible released number of engine start-stop interventions might be made possible to the user only at the end of the provided service life of the driving engine, or at the end of the provided overall mileage of a motor vehicle operated using the driving engine. This is done by distributing the engine start-stop interventions over the entire service life of the driving engine.

Moreover, the engine start-stop interventions may be released as a function of a statement concerning a current mileage of the motor vehicle operated using the driving engine.

The engine start-stop intervention determined by the engine start-stop function may be released as a function of a utilization profile of the engine start-stop function, the utilization profile stating when the engine start-stop function will be restricted.

The utilization profile may, in particular, give a statement as to the number of admissible starting processes, as a function of current mileage, the restriction of the engine start-stop function being only carried out if a number of executed starting processes exceeds the number of admissible starting processes.

In order to avoid that a certain utilization profile of the engine start-stop function could lead to the number of admissible starting processes being reached or exceeded before the service life of the driving engine is reached, a strategy may thus be employed, as a function of the manner of utilization, which occasionally prevents the starting processes that are effected by the engine start-stop function. This is able to take place if the activation of the engine start-stop function leads to a number of engine start-stop interventions which no longer agrees with the admissible utilization profile or which would, purely mathematically, lead to the exceeding of the total number of admissible starting processes before the expiration of the service life of the driving engine.

Furthermore, the statement on the number of admissible starting processes may be given with the aid of a specified function, which defines the number of admissible starting processes as a function of the mileage of the vehicle.

According to one specific example embodiment, the statement on the number of executed starting processes may be ascertained in that the number of the starting processes effected by the engine start-stop function, that are a function of an operating variable, are taken into account, in particular, a fuel temperature or an engine temperature, in a weighted manner.

Moreover, it may be provided that an engine start-stop intervention determined by the engine start-stop function be always released as a function of a temperature of the driving engine and/or as a function of an initial mileage of the motor vehicle.

According to one additional aspect, a device is provided for operating an engine start-stop function for a driving engine of a motor vehicle, especially for an internal combustion engine. The device includes:

The engine start-stop functional unit for carrying out the engine start-stop function, executing engine start-stop interventions in the form of an automatic shutting down and a subsequent automatic switching on of the driving engine, as a function of one or more vehicle states, a limiting unit, in order to release an engine start-stop intervention determined by the engine start-stop function, as a function of a statement on the number of starting processes of the driving engine carried out.

According to one further aspect, an engine system is provided having the above device and a driving engine.

According to a further aspect, a computer program is provided, which includes a program code, which implements the above method when it is run on a data processing unit.

BRIEF DESCRIPTION OF SEVERAL VIEWS OF THE DRAWING

FIG. 3 shows a limiting strategy matrix for establishing a strategy for suppressing an engine stop specified by the engine start-stop function.

DETAILED DESCRIPTION OF THE INVENTION

Figure 1:
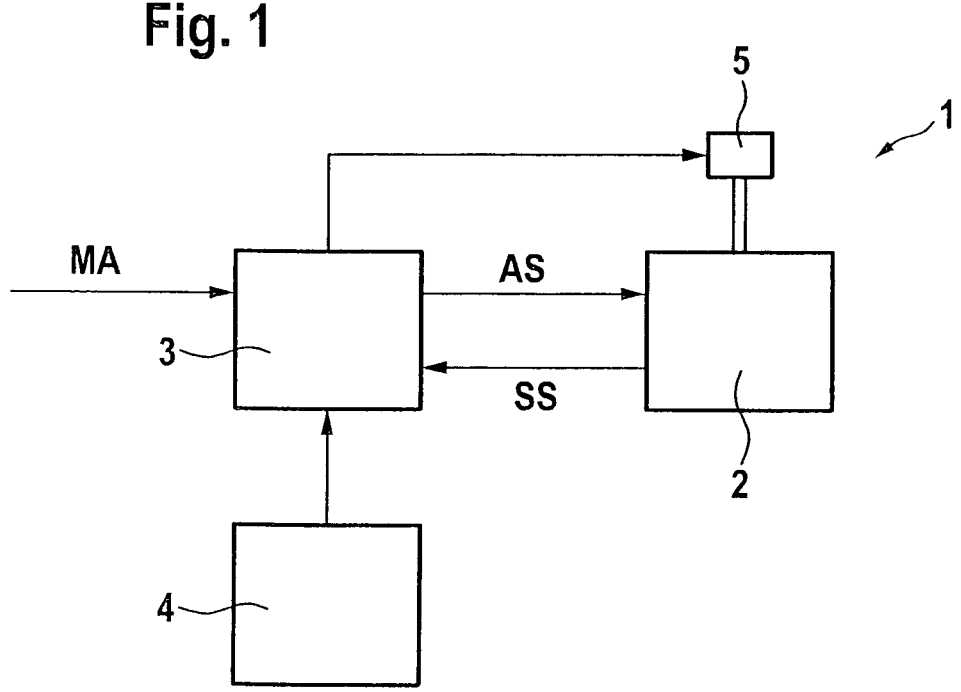
FIG. 1 shows a schematic representation of an engine system having an engine start-stop function for a driving unit.

FIG. 1 shows a schematic representation of an engine system 1 for operating a vehicle (not shown). Engine system 1 includes a driving engine 2, which is developed particularly as an internal combustion engine. Other driving engines may also be provided, and for implementing the advantages, according to the present invention, driving engine 2 corresponds to a type that consumes energy or power in a stand-by operation, so that, under certain circumstances, shutting down driving engine 2 and switching on driving engine 2 when required, is more energy-efficient.

In the specific embodiment described, driving engine 2 is developed as an internal combustion engine which is controlled by an engine control unit 3. For the control of internal combustion engine 2, engine control unit 3 receives sensor signals SS from sensors (not shown) situated in internal combustion engine 2. Engine control unit 3 generates control signals AS for controlling internal combustion engine 2.

The control of internal combustion engine 2 takes place, as a rule, as a function of torque requests, such as the driver's torque command specified via the accelerator, and as a function of other torque requests, such as from an air-conditioning system.

Furthermore, an engine start-stop functional unit 4 is provided, which instructs engine control unit 3 to shut down internal combustion engine 2 as required, or to start internal combustion engine 2 again with the aid of a starter 5. For this, the engine start-stop function implemented in engine start-stop functional unit 4 provides a switch-on and a shut-down signal for engine control unit 3. Engine start-stop functional unit 4 may be developed in integrated fashion together with engine control unit 3. When starts or starting processes based on the engine start-stop function are discussed below, this implies the entire process of shutting down and subsequent switching back on by the engine start-stop function, beginning with an automatic shutting down of the internal combustion engine.

Engine start-stop functional unit 4 stops internal combustion engine 2 and restarts it again automatically, when certain vehicle states are present. Internal combustion engine 2 may, for instance, be stopped by the engine start-stop function of the engine start-stop functional unit 4, if a vehicle state is detected in which the vehicle is standing still, and it is to be expected that the standstill of the vehicle will exceed a minimum time. Furthermore, engine start-stop functional unit may instruct engine control unit 3 to shut down internal combustion engine 2, if the requested drive torque is to be provided completely by an additional driving motor, such as an electric motor. In addition, the engine start-stop function may provide switching on internal combustion engine 2 again, if a drive torque is to be called for, for instance, when the driver of the vehicle operates the accelerator. At this point, we shall not go further into the exact design or implementation of the engine start-stop function.

Depending on the handling characteristics or the operating conditions of the vehicle, it may happen that the engine start-stop function requests a frequent or less frequent switching on or shutting down of internal combustion engine 2. Since, above all, switching-on processes of internal combustion engine 2 mean great stress for the components of internal combustion engine 2, and also for the entire engine system 1, individual components of engine system 1 are greatly stressed by frequent switching on.

Each of the components of engine system 1 is designed for a specified maximum service life, in the form of a statement of a maximum service life or a maximum number of switching cycles, actuation cycles, operating cycles and the like, which is given on the part of the manufacturer. If, for instance, the specified number of maximum actuating cycles for a component has been exceeded, the risk of failure of this component is statistically increased. Since the performance reliability of the individual components of internal combustion engine 2, as a rule, is essential for the working order of internal combustion engine 2, it should be avoided at all costs that a component is operated at a greater number of actuating cycles, and the like, than has been specified by the manufacturer.

The engine start-stop function does not normally take into account the number of admissible switching on and shutting down processes, of internal combustion engine 2 and the components in it. Depending on the strategy of the engine start-stop function applied, this may lead to the number of admissible actuating cycles of individual components being exceeded.

Figure 2:
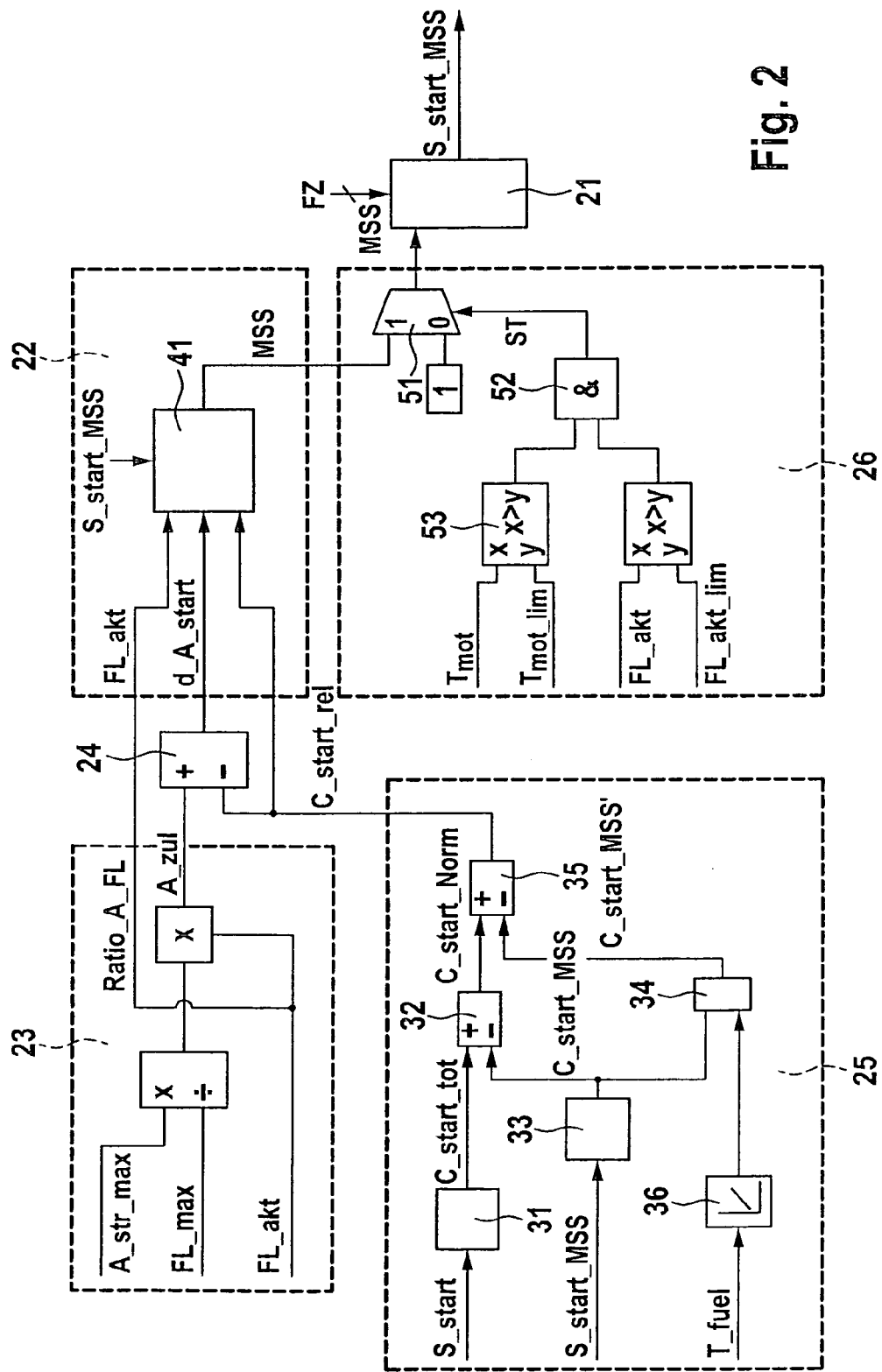
FIG. 2 shows a functional block diagram of a function for operating an engine start-stop function for a driving unit.

In the functional representation of FIG. 2, a strategy is shown, using which it may be avoided that, during the intended overall service life of the vehicle, the number of actuating cycles of the components exceeds the manufacturer's specified maximum number. The functional representation shown in FIG. 2 is implemented in engine start-stop functional unit 4.

FIG. 2 shows the engine start-stop function (MSS) that is implemented in MSS block 21. MSS block 21 receives vehicle state signals FZ, which give the vehicle state, so as to decide whether internal combustion engine 2 is to be shut down or switched on according to a strategy for saving fuel and avoiding $CO_2$ emissions. At this point we shall not go further into the exact functioning method and the implemented strategy. The engine start-stop function is a function which is carried out automatically, without additional action on the part of the driver or a user of internal combustion engine 2, that is, internal combustion engine 2 is able to be started and shut down by the engine start-stop function.

MSS block 21 has an additional input for receiving a release signal MSS. Release signal MSS indicates whether the engine start-stop function is allowed to be carried out or not. If release signal MSS is at a high level, the function of MSS block 21 is allowed to be carried out, while at a low level the function is suppressed, i.e. no performance of an engine start-stop function takes place. MSS block 21 suppresses shutting down internal combustion engine 2 if release signal MSS is at a low level, but allows it at a high level. Release signal MSS that is present has no effect on switching on internal combustion engine 2, that is, internal combustion engine 2 is always switched on according to the engine start-stop function if the engine start-stop function has itself automatically shut down internal combustion engine 2 before, and switching on is requested according to the state of the vehicle.

In a limiting block 22, release signal MSS is generated corresponding to a current start number difference d_A between a start number A_zul, that is currently admissible according to a mileage, and a statement on component utilization. The statement of component utilization may be given, for example, in the form of a statement on the entire number of engine starts C_start_rel, carried out during the current service life of the engine system.

The starts per mileage ratio ratio_A_FL and the admissible number of starts A_zul are ascertained and provided with the aid of a reference variable block 23. For this purpose, reference variable block 23 receives a statement on the maximum number of admissible starts A_str_max, which are to be admitted during the service life of the engine system, and a statement on the maximum mileage FL_max of the vehicle using the engine system, in a unit of route distance in kilometers or miles, for example. Alternatively, the statement on maximum mileage FL_max of the vehicle may also be given in a time duration, such as in hours or days. The ratio of the maximum number of admissible starts A_str_max and the maximum mileage FL_max corresponds to the starts per mileage ratio ratio_A_FL. From the product of starts per mileage ratio ratio_A_FL and a statement on a current mileage FL_akt, which is given in the same unit (kilometers, miles, time duration) as the maximum driving performance FL_max, one obtains the currently admissible number of starts A_zul, which are output to a difference block 24.

The relevant number of starts C_starts_rel is subtracted from the admissible number of starts A_zul, to obtain a start number difference d_A_start. Start number difference d_A_start is provided to limiting block 22, and it states whether the number of starting processes of the internal combustion engine, carried out at the current mileage, deviates from the admissible number of starting processes in the positive or the negative direction. If start number difference d_A_start is negative, the number of starting processes carried out exceeds the number of admissible starting processes.

The relevant number of starting processes C_start_rel, which represents a statement of component utilization, is ascertained in a component utilization block 25. In component utilization block 25, in a first start counter 31, the number of starting processes of internal combustion engine 2 carried out overall is counted with the aid of a start signal S_start, which gives each engine start. First start counter 31 is able to be incremented by start signal S_start. Present at the output of start counter 31 is a total start number value C_start_tot, which is passed on to a subtraction block 32. Using a second start counter 33, the starting processes of internal combustion engine 2 effected by MSS block 21 are counted. For this purpose, MSS start signal S_start_MSS is applied at the input of second start counter 33, so that the total number of engine starts generated by the engine start-stop function is given at its output. MSS start number C_start_MSS is subtracted from the total start number C_start_tot, and this gives the normal start number C_start_Norm, which is passed on to a summing element 35. Normal start number C_start_Norm corresponds to a statement of the number of normal starting processes (effected by the user) of internal combustion engine 2. MSS start number C_start_MSS is supplied to a weighting unit 34, in which the number of MSS starting processes is weighted as a function of a fuel temperature T_fuel.

For this purpose, a statement on current fuel temperature T_fuel is supplied to a characteristics map block 36, by which a weighting value is assigned to each fuel temperature T_fuel. The weighting value is supplied to weighting block 34. The output of weighting block 34 gives the weighted number of motor starts C_start_MSS' generated by the engine start-stop function, and is guided to summation block 35. In summation block 35, the relevant number of engine starts is output as a statement on component utilization.

Limiting block 22 includes a limiting unit 41, in which a release signal MSS is generated corresponding to start number difference d_A_start and corresponding to MSS start signal S_start_MSS of MSS block 21, which states that an automatic engine start is to be admitted or not. In principle, limiting unit 41 works in such a way that, in the case of a positive start number difference d_A_start or in the case of a start number difference d_A_start of 0, release signal MSS is set to a high level, so that each automatic engine start is admitted.

In the limiting strategy matrix of FIG. 3, the columns correspond to start number difference d_A_start and the rows correspond to successive engine stops in a unit of route distance, such as 1 km or in a time unit, such as 1 min, requested by MSS block 21. At the end of a unit of route distance or time unit, counting starts over again. The entries in the matrix correspond to release signal MSS. As may be seen from the matrix, in the case of a start number difference d_A_start of −1 to −3, only every other engine stop is admitted by the engine start-stop function, while in the case of a start number difference of −4 or −5, only every third, and, in the case of a start number difference of −6 only every fourth automatic engine stop is admitted. Beginning at a start number difference d_A_start of −7 or less, no further automatic engine stop is admitted according to the engine start-stop function. The specific assignment of start number difference d_A_start to the ratio and to the sequence of admitted engine stops and suppressed engine stops may be allocated almost at will. It is meaningful, however, not to admit any further automatic engine stops below a start number difference.

Figure 4:
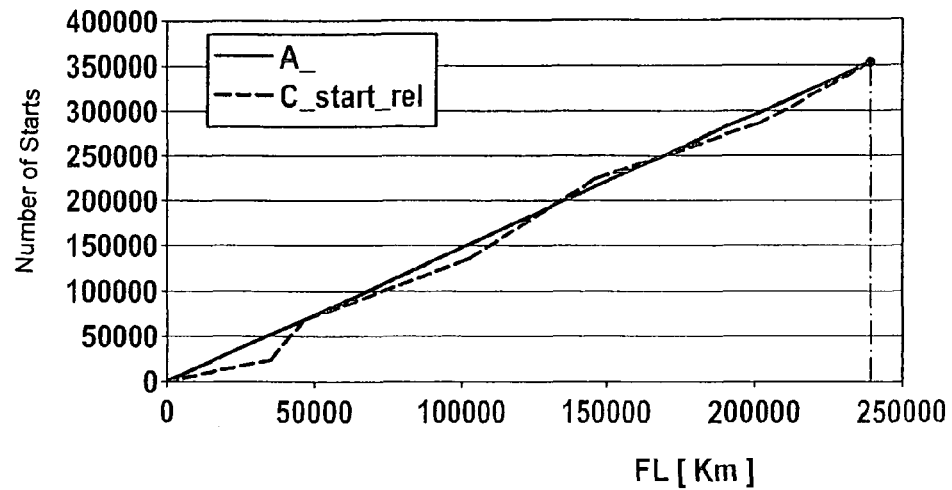
FIG. 4 shows an illustration of a limiting curve for limiting engine start-stop interventions.

FIG. 4 shows the number of starts plotted against mileage FL. The solid line corresponds to the number of admissible starts A_zul plotted against the mileage, while the dashed line shows the actual number of engine starts.

Furthermore, a release decision block 26 is provided which decides whether the engine start-stop function is controlled in limiting block 22, that is, as a function of release signal MSS, or released permanently. This is carried out by providing a multiplexer 51 at whose first input release signal MS of limiting block 22 is applied, and at whose second input a permanent high level is applied. As a function of a control signal ST, the high level is either permanently applied to MSS block 21 as a release signal, in order to activate the engine start-stop function permanently, or release signal MSS is switched through by limiting block 22 to MSS block 21, so as to activate or deactivate the engine start-stop function according to the limiting function that is implemented in limiting unit 41.

Control signal ST is generated as a function of engine temperature $T_{mot}$ and as a function of current mileage FL_akt. The low level of control signal ST, which as release signal permanently outputs the high level to MSS block 21, is generated with the aid of an AND block 52 if either engine temperature $T_{mot}$ is less than an engine temperature boundary value $T_{mot\_lim}$, as established by a first comparative unit 53, or current mileage FL_akt is less than a minimum mileage FL_akt_lim (such as 1000 km), which describes a new state of the engine system or the motor vehicle. When these conditions are present, the limiting strategy is not to be executed. This means that restrictions of the function of MSS block 21 are only carried out at an engine temperature $T_{mot}$ above an engine limiting temperature TMot_lim and at a mileage FL above a minimum mileage FL_akt_lim.

Figure 5:
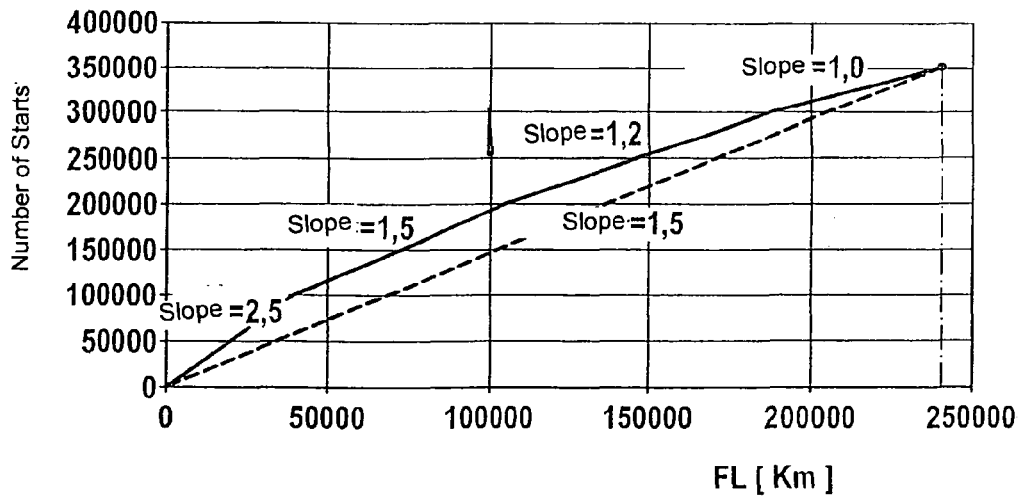
FIG. 5 shows an illustration of a limiting curve for limiting engine start-stop interventions according to a further specific embodiment.

In the abovementioned specific embodiment, reference variable block 23 generates the starts per mileage ratio ratio_A_FL according to the specified number of maximum starts A_str_max and maximum mileage FL_max, and ascertains the admissible number of starting processes A_zul as a function of the statement on current mileage FL_akt. Alternatively, a characteristics map unit may also be provided which, as a function of current mileage FL_akt reads out an admissible number of starting processes, so that, by contrast to characteristics curve of FIG. 4, linear curves of the number of admissible starting processes A_zul plotted against mileage FL are also not possible. This is illustrated in FIG. 5, for example, for the first one hundred thousand starting processes a higher slope, having 2.5 starts per kilometer being set, between the $100,000^{th}$ starting process and up to the $200,000^{th}$ starting process a reduced slope of 1.5 starting processes per kilometer being set, from the $200,000^{th}$ up to the $300,000^{th}$ starting process the slope being reduced to 1.2 starting processes per kilometer and the last starting processes being set within the admissible service life of the $300,000^{th}$ to $350,000^{th}$ starting process being set at a slope of one starting process per kilometer, in order to achieve the target of 350,000 starting processes per 240,000 kilometer. The limiting strategy of limiting block 22 is not impaired by this.

If the provided maximum mileage FL_max is reached or exceeded, it may be provided, on the one hand, completely to release the limitation by limiting block 22, that is, to leave release signal MSS permanently at a high level, and thus to release the engine start-stop function generally, or it may be provided generally to prevent the engine start-stop function and thus to increase as much as possible the remaining service life of internal combustion engine 2, by minimizing to the greatest extent possible additional wear of the components. Any other strategy for applying the engine start-stop function after the expiration of the maximum mileage is also conceivable.

What is claimed is:

1. A method for performing automatic engine start-stop control for an engine of a motor vehicle, comprising:
    performing an engine start-stop function, wherein the engine start-stop function executes engine start-stop interventions in the form of an automatic shutting down and a subsequent automatic switching on of the engine as a function of at least one vehicle state;
    wherein the engine start-stop interventions are selectively prevented as a function of the number of starting procedures of the engine carried out, and
    wherein the number of starting procedures of the engine is the number of starting processes of internal combustion engine carried out overall.

2. The method as recited in claim 1, wherein the engine start-stop interventions are selectively prevented as a function of a current mileage of the engine.

3. The method as recited in claim 2, wherein the engine start-stop interventions are prevented as a function of a utilization profile of the engine start-stop function, wherein the utilization profile specifies restrictions on the operation of the engine start-stop function.

4. The method as recited in claim 3, wherein the utilization profile specifies the number of admissible starting processes as a function of a current mileage of the engine, the prevention of the engine start-stop interventions being implemented only if a number of previously performed starting processes exceeds the number of admissible starting processes.

5. The method as recited in claim 4, wherein, in ascertaining the number of previously performed starting processes, the number of starting processes effected by the engine start-stop function is taken into account as a function of one of a fuel temperature or an engine temperature, in a weighted manner.

6. The method as recited in claim 1, wherein the engine start-stop interventions are selectively prevented as a function of at least one of a temperature of the engine and an initial mileage of the engine.

7. A non-transitory computer-readable storage medium storing a computer program having a plurality of program codes which, when executed on a computer, performs a method for performing automatic engine start-stop control for an engine of a motor vehicle, the method comprising:
    performing an engine start-stop function, wherein the engine start-stop function executes engine start-stop interventions in the form of an automatic shutting down and a subsequent automatic switching on of the engine as a function of at least one vehicle state;
    wherein the engine start-stop interventions are selectively prevented as a function of the number of starting procedures of the engine carried out, and
    wherein the number of starting procedures of the engine is the number of starting processes of internal combustion engine carried out overall.

8. A device for operating an engine start-stop function for an engine of a motor vehicle, comprising:
    an engine start-stop functional unit configured to perform the engine start-stop function, wherein the engine start-stop function executes engine start-stop interventions in the form of an automatic shutting down and a subsequent automatic switching on of the engine as a function of at least one vehicle state; and
    a limiting unit configured to selectively prevent the engine start-stop interventions as a function of the number of starting procedures of the engine carried out;
    wherein the number of starting procedures of the engine is the number of starting processes of internal combustion engine carried out overall.

9. The device as recited in claim 8, wherein the engine start-stop interventions are selectively prevented as a function of a current mileage of the engine.

10. The device as recited in claim 9, wherein the engine start-stop interventions are prevented as a function of a utilization profile of the engine start-stop function, wherein the utilization profile specifies restrictions on the operation of the engine start-stop function.

11. The device as recited in claim 10, wherein the utilization profile specifies the number of admissible starting processes as a function of a current mileage of the engine, the prevention of the engine start-stop interventions being implemented only if a number of previously performed starting processes exceeds the number of admissible starting processes.

12. The device as recited in claim 11, wherein, in ascertaining the number of previously performed starting processes, the number of starting processes effected by the engine start-stop function is taken into account as a function of one of a fuel temperature or an engine temperature, in a weighted manner.

13. The device as recited in claim 8, wherein the engine start-stop interventions are selectively prevented as a function of at least one of a temperature of the engine and an initial mileage of the engine.

14. The computer-readable storage medium as recited in claim 7, wherein the engine start-stop interventions are selectively prevented as a function of a current mileage of the engine.

15. The computer-readable storage medium as recited in claim 14, wherein the engine start-stop interventions are prevented as a function of a utilization profile of the engine start-stop function, wherein the utilization profile specifies restrictions on the operation of the engine start-stop function.

16. The computer-readable storage medium as recited in claim 15, wherein the utilization profile specifies the number of admissible starting processes as a function of a current mileage of the engine, the prevention of the engine start-stop interventions being implemented only if a number of previously performed starting processes exceeds the number of admissible starting processes.

17. The computer-readable storage medium as recited in claim 16, wherein, in ascertaining the number of previously performed starting processes, the number of starting processes effected by the engine start-stop function is taken into account as a function of one of a fuel temperature or an engine temperature, in a weighted manner.

18. The computer-readable storage medium as recited in claim 7, wherein the engine start-stop interventions are selectively prevented as a function of at least one of a temperature of the engine and an initial mileage of the engine.

* * * * *